(12) United States Patent
Terwilliger et al.

(10) Patent No.: US 12,180,846 B2
(45) Date of Patent: Dec. 31, 2024

(54) ELECTRIC HEATING FOR TURBOMACHINERY CLEARANCE CONTROL POWERED BY HYBRID ENERGY STORAGE SYSTEM

(71) Applicant: Raytheon Technologies Corporation, Farmington, CT (US)

(72) Inventors: Neil Terwilliger, Cheshire, CT (US); Christopher J Hanlon, Sturbridge, CT (US); Sorin Bengea, Glastonbury, CT (US); Zubair Ahmed Baig, South Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 175 days.

(21) Appl. No.: 17/866,841

(22) Filed: Jul. 18, 2022

(65) Prior Publication Data

US 2023/0136475 A1 May 4, 2023

Related U.S. Application Data

(62) Division of application No. 16/938,579, filed on Jul. 24, 2020, now Pat. No. 11,421,545, which is a (Continued)

(51) Int. Cl.
*F01D 11/24* (2006.01)
(52) U.S. Cl.
CPC .......... *F01D 11/24* (2013.01); *F05D 2240/24* (2013.01); *F05D 2240/55* (2013.01); *F05D 2260/201* (2013.01); *F05D 2270/62* (2013.01)

(58) Field of Classification Search
CPC .. F01D 11/24; F05D 2240/24; F05D 2240/55; F05D 2260/201; F05D 2270/62
See application file for complete search history.

(56) References Cited

U.S. PATENT DOCUMENTS

| 4,482,293 A | 11/1984 | Perry |
| 5,167,487 A | 12/1992 | Rock |

(Continued)

FOREIGN PATENT DOCUMENTS

| CA | 2558799 | 3/2007 |
| EP | 2597274 | 5/2013 |

(Continued)

OTHER PUBLICATIONS

Neil Terwilliger, U.S. Appl. No. 15/979,085, filed May 14, 2018 and entitled "Electric Heating for Turbomachinery Clearance Control", 34 pages.

(Continued)

*Primary Examiner* — Sabbir Hasan
(74) *Attorney, Agent, or Firm* — SNELL & WILMER L.L.P.

(57) ABSTRACT

A method for active bi-directional control of an outer structure of a gas turbine engine comprises sending, by a controller, a first control signal to a power electronics for varying an electric current supplied to a heating element to cause the outer structure to move in a first radial direction, and sending, by the controller, a second control signal to a valve assembly for varying a cooling air flow supplied to the outer structure to cause the outer structure to move in a second radial direction. The first radial direction is opposite the second radial direction.

19 Claims, 11 Drawing Sheets

Related U.S. Application Data division of application No. 15/979,112, filed on May 14, 2018, now Pat. No. 10,760,444.

(56) References Cited

U.S. PATENT DOCUMENTS

| | | | |
|---|---|---|---|
| 5,181,826 | A | 1/1993 | Rock |
| 5,188,506 | A | 2/1993 | Creevy |
| 5,667,358 | A | 9/1997 | Gaul |
| 6,896,464 | B1 | 5/2005 | Diakunchak |
| 6,896,484 | B2 | 5/2005 | Diakunchak |
| 7,740,443 | B2 | 6/2010 | Shirooni |
| 8,776,530 | B2 | 7/2014 | Shirooni |
| 9,353,641 | B2 * | 5/2016 | Philippot ............... F01D 25/10 |
| 9,890,640 | B2 | 2/2018 | Vetters |
| 10,132,186 | B2 | 11/2018 | Shapiro |
| 10,794,214 | B2 | 10/2020 | Suciu |
| 2010/0054911 | A1 | 3/2010 | Wilson |
| 2013/0251500 | A1 | 9/2013 | Cheung |
| 2014/0314568 | A1 | 10/2014 | Vetters |
| 2015/0003958 | A1 | 1/2015 | Uskert |
| 2015/0369076 | A1 | 12/2015 | McCaffrey et al. |
| 2018/0054857 | A1 | 2/2018 | Shuck et al. |
| 2018/0320542 | A1 * | 11/2018 | Suciu ..................... F01D 11/24 |
| 2019/0345835 | A1 | 11/2019 | Terwilliger |
| 2019/0345836 | A1 | 11/2019 | Terwilliger |

FOREIGN PATENT DOCUMENTS

| | | |
|---|---|---|
| FR | 2890685 | 3/2007 |
| FR | 2943717 | 10/2010 |
| FR | 2949808 | 3/2011 |
| GB | 2117450 | 10/1983 |
| WO | 2013141938 | 9/2013 |
| WO | 201909909 | 5/2019 |

OTHER PUBLICATIONS

European Patent Office, European Office Action dated Jan. 26, 2023 in Application No. 20215618.8.

European Patent Office, European Search Report dated Sep. 16, 2019 in Application No. 19174395.4.

USPTO, Non-Final Office Action dated Dec. 27, 2019 in U.S. Appl. No. 15/979,085.

European Patent Office, European Search Report dated Sep. 16, 2019 in Application No. 19174392.1.

USPTO; Notice of Allowance dated Apr. 20, 2022 in U.S. Appl. No. 16/938,579.

USPTO, Requirement Restriction dated Jan. 3, 2020 in Application No. 15/979,112.

USPTO, Notice of Allowance dated Apr. 29, 2020 in Application No. 15/979,112.

USPTO, Final Office Action dated Jun. 23, 2020 in U.S. Appl. No. 15/979,085.

European Patent Office, Office Action dated Jun. 19, 2020 in EP Application No. 19174395.4.

USPTO; Non-Final Office Action dated Nov. 27, 2020 in U.S. Appl. No. 15/979,085.

USPTO; Advisory Action dated Sep. 24, 2020 in U.S. Appl. No. 15/979,085.

USPTO; Notice of Allowance dated May 13, 2021 in U.S. Appl. No. 15/979,085.

European Patent Office, European Search Report dated May 4, 2021 in Application No. 20215618.8.

USPTO; Non- Final Office Action dated Nov. 2, 2021 in U.S. Appl. No. 16/938,579.

European Patent Office, European Office Action dated Feb. 1, 2024 in Application No. 20215618.8.

* cited by examiner

ELECTRIC HEATING FOR TURBOMACHINERY CLEARANCE CONTROL POWERED BY HYBRID ENERGY STORAGE SYSTEM

CROSS REFERENCE TO RELATED APPLICATIONS

This application is a divisional of, and claims priority to, and the benefit of U.S. patent application Ser. No. 16/938,579, filed on Jul. 24, 2020, and entitled "ELECTRIC HEATING FOR TURBOMACHINERY CLEARANCE CONTROL POWERED BY HYBRID ENERGY STORAGE SYSTEM." The '579 application is a divisional of, claims priority to and the benefit of, U.S. patent application Ser. No. 15/979,112, filed on May 14, 2018, and entitled "ELECTRIC HEATING FOR TURBOMACHINERY CLEARANCE CONTROL POWERED BY HYBRID ENERGY STORAGE SYSTEM," (aka U.S. Pat. No. 10,760,444 issued Aug. 12, 2020). Both of which are incorporated by reference herein in their entirety for all purposes.

FIELD

The present disclosure relates to gas turbine engines, and more specifically, to the management of turbomachinery clearances.

BACKGROUND

Gas turbine engines typically include a fan delivering air into a compressor. The air is compressed in the compressor and delivered into a combustion section where it is mixed with fuel and ignited. Products of this combustion pass downstream over turbine blades, driving them to rotate. Turbine rotors, in turn, drive the compressor and fan rotors. The efficiency of the engine is impacted by ensuring that the products of combustion pass in as high a percentage as possible across the turbine blades. Leakage around the blades reduces efficiency. Thus, a blade outer air seal (BOAS) is provided radially outward of the blades to prevent leakage.

The BOAS is spaced from a radially outer part of the blade by a tip clearance. The BOAS is traditionally associated with a carrier element that is mounted to an engine case. Since the blades, the BOAS, and the structure that support the BOAS are different sizes and/or are formed of different materials, they respond to temperature changes in different manners. As these structures expand at different rates in response to temperature changes, the tip clearance may be reduced and the blade may rub on the BOAS, or the tip clearance may increase reducing efficiency, both of which are undesirable.

Clearance control systems are used to control the tip clearance under different operational conditions. Traditional clearance control systems utilize valves and manifolds to direct fan air to specific engine case locations. The cooling air thermally shrinks the engine case at these locations to improve tip clearance and thus fuel burn. However, these manifolds and valves are large, heavy, and expensive. These systems can also be slow to respond and provide limited clearance improvement. By further reducing tip clearances increasing engine efficiency demands can be met.

SUMMARY

A clearance control system for a gas turbine engine is disclosed, comprising a rotor blade, an outer structure disposed radially outward from the rotor blade, a heating element configured to cause the outer structure to be heated in response to electric current being supplied to the heating element, wherein a gap between the rotor blade and the outer structure is at least one of increased, decreased, and maintained in response to the outer structure being heated, a hybrid electric power source configured to supply the electric current to the heating element, and a controller configured to regulate the electric current being supplied to the heating element.

In various embodiments, the hybrid electric power source comprises at least one of a battery, a supercapacitor, and an ultracapacitor.

In various embodiments, the clearance control system further comprises a first converter in electronic communication with the battery and the capacitor.

In various embodiments, the clearance control system further comprises a second converter configured to receive DC power from the first converter and supply the heater element with electrical power.

In various embodiments, the second converter comprises a DC-AC inverter and the heating element is configured to cause the outer structure to be heated via induction heating.

In various embodiments, the clearance control system further comprises a valve assembly configured to meter a cooling air flow to the outer structure.

In various embodiments, the controller is configured to at least one of decrease, maintain, or increase the gap by coordinating the cooling air flow and the electric current being supplied to the heating element.

In various embodiments, the controller coordinates the cooling air flow via valve position control of the valve assembly.

In various embodiments, the controller is configured to send a first control signal to a power electronics for varying the electric current supplied to a heating element to cause the outer structure to move in a first radial direction, and send a second control signal to the valve assembly for varying a cooling air flow supplied to the outer structure to cause the outer structure to move in a second radial direction, wherein the first radial direction is opposite the second radial direction A hybrid energy storage and control system for a clearance control system for a gas turbine engine is disclosed, comprising a hybrid electric power source, a first converter, a second converter configured to receive electric power from the hybrid electric power source via the first converter and configured to send the electric power to a heating element for controlling a blade tip clearance between a rotor blade and an outer structure of the gas turbine engine, and a controller in electronic communication with the second converter.

In various embodiments, the hybrid electric power source comprises at least one of a battery, a supercapacitor, and an ultracapacitor.

In various embodiments, the controller is configured to regulate the electric power supplied to the heating element via the second converter.

In various embodiments, the first converter is configured to regulate power between at least one of the battery, the supercapacitor, and the ultracapacitor.

In various embodiments, the second converter comprises a DC-DC converter, the heating element configured to heat up the outer structure by resistive heating.

In various embodiments, the second converter comprises a DC-AC inverter, the heating element configured to heat up the outer structure by induction heating.

In various embodiments, the second converter comprises a AC-AC converter, the heating element configured to heat up the outer structure by induction heating.

In various embodiments, at least one of the battery, the supercapacitor, and the ultracapacitor is configured to receive electric power from a generator in response to the at least one of the battery, the supercapacitor, and the ultracapacitor being depleted of electric power by the heating element.

A method for active bi-directional control of an outer structure of a gas turbine engine is disclosed, comprising sending, by a controller, a first control signal to a power electronics for varying an electric current supplied to a heating element to cause the outer structure to move in a first radial direction, and sending, by the controller, a second control signal to a valve assembly for varying a cooling air flow supplied to the outer structure to cause the outer structure to move in a second radial direction, wherein the first radial direction is opposite the second radial direction.

In various embodiments, the method further comprises varying a blade tip clearance in response to the outer structure moving.

In various embodiments, the method further comprises receiving, by the controller, an electrical current value currently being supplied to the heating element, receiving, by the controller, a current valve position, determining, by the controller, a current blade tip clearance value based upon the electrical current value and the current valve position, and receiving, by the controller, a target blade tip clearance value, wherein the first control signal and the second control signal are based upon the current blade tip clearance value and the target clearance value.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
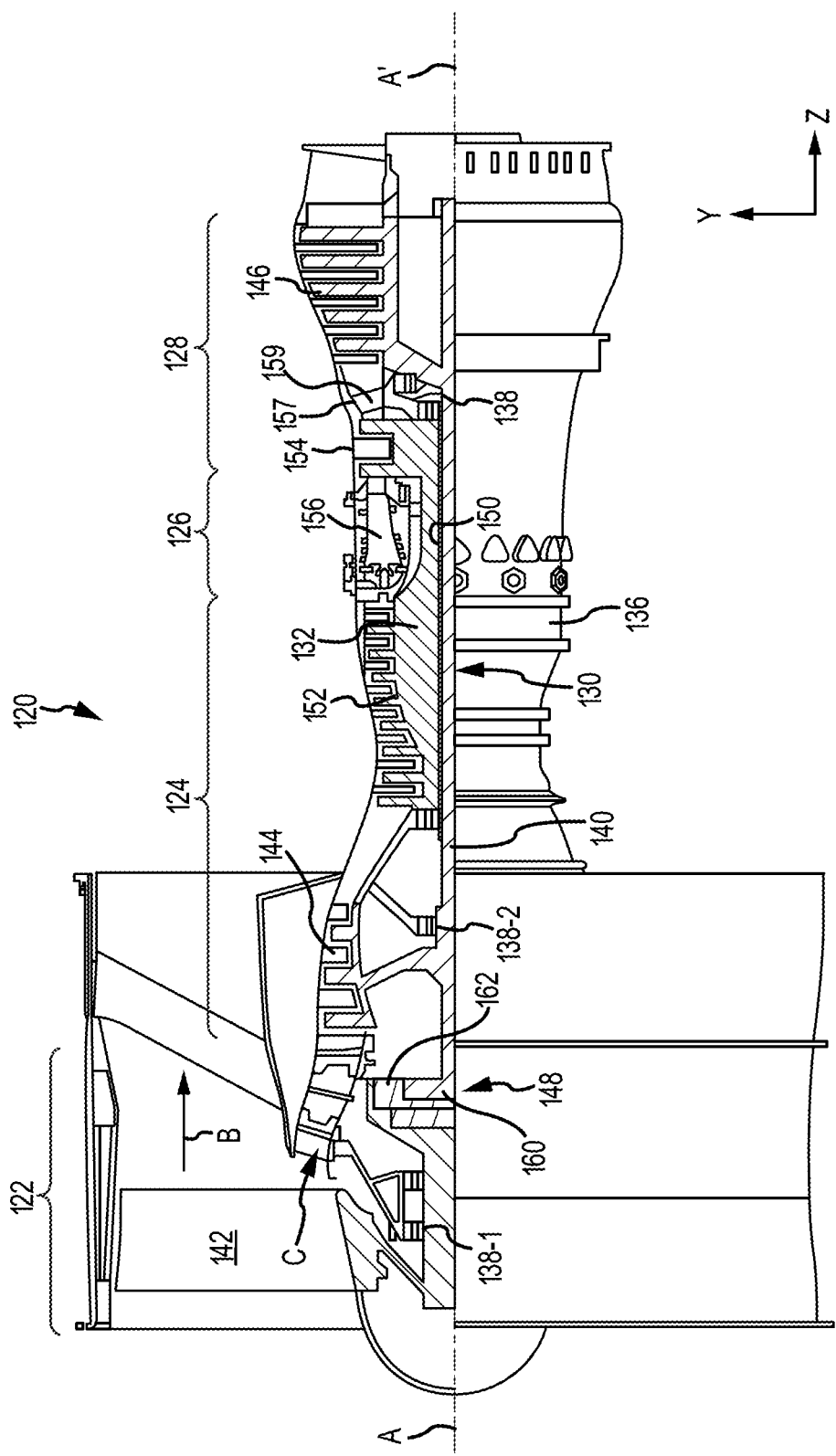
FIG. 1 illustrates a schematic representation of one example of a gas turbine engine, in accordance with various embodiments.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "distal" refers to the direction radially outward, or generally, away from the axis of rotation of a turbine engine. As used herein, "proximal" refers to a direction radially inward, or generally, towards the axis of rotation of a turbine engine. As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

A clearance control system, as provided herein, may be useful gas turbine engines, including for use in the turbine section and/or in the compressor section of the gas turbine engine, and may be useful for any other suitable turbomachinery where rotor blade tip clearance control is desirable.

A clearance control system, as provided herein, may include a heating element for transferring thermal energy to an outer structure to cause the outer structure to thermally grow (e.g., to move in a first radial direction) and a valve assembly for regulating a cooling air flow directed to the outer structure to cause the outer structure to thermally shrink (e.g., to move in a second radial direction). Active bi-directional control of the outer structure in both radial directions may allow for decreased response time (i.e., decrease time for thermal expansion and/or contraction of the outer structure) and faster changes in blade tip clearance. A clearance control system, as provided herein, may allow for tighter tolerances manufactured into the system's components due to increased response time of blade tip clearance control.

In various embodiments, and with reference to FIG. 1, a gas turbine engine 120 is disclosed. Gas turbine engine 120 may comprise a two-spool turbofan that generally incorporates a fan section 122, a compressor section 124, a combustor section 126, and a turbine section 128. Gas turbine engine 120 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 120 may comprise a low speed spool 130 and a high speed spool 132 mounted for rotation about an engine central longitudinal axis A-A' relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about engine central longitudinal axis A-A'. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

Figure 2A:
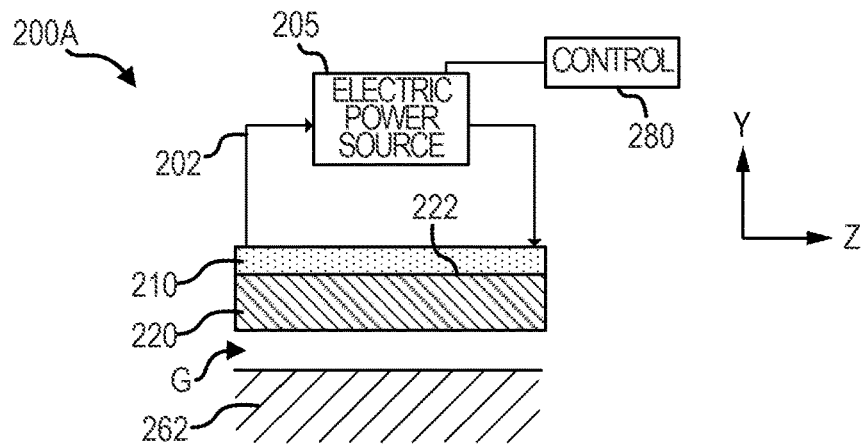
FIG. 2A illustrates a heating element coupled to an outer surface of an outer structure disposed radially outward from a blade for maintaining a blade tip clearance gap, in accordance with various embodiments.
Figure 2B:
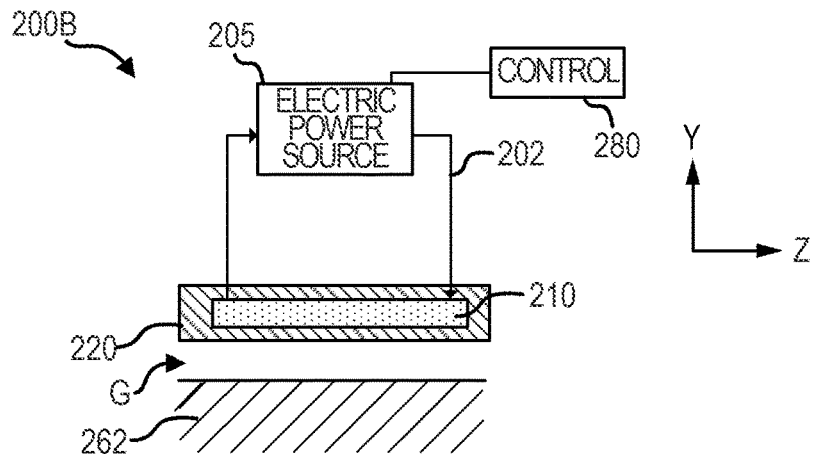
FIG. 2B illustrates a heating element embedded in an outer structure disposed radially outward from a blade for maintaining a blade tip clearance gap, in accordance with various embodiments.
Figure 2C:
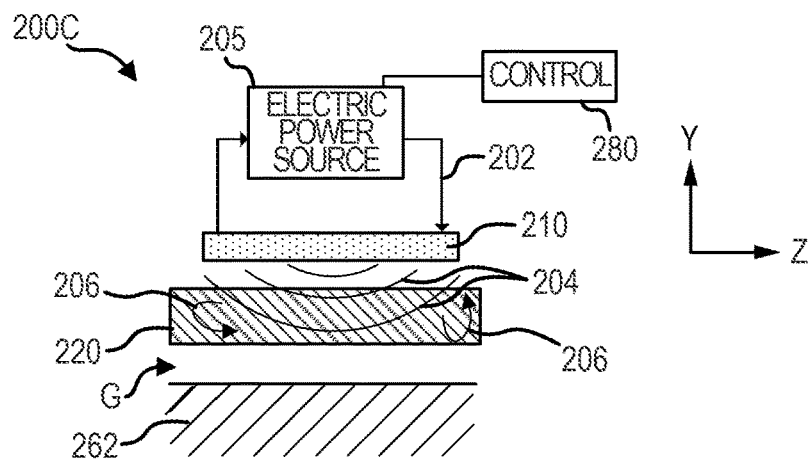
FIG. 2C illustrates a cross-section view of a heating element spaced apart from an outer surface of an outer structure disposed radially outward from a blade for maintaining a blade tip clearance gap, in accordance with various embodiments.

With combined reference to FIG. 2A, FIG. 2B, and FIG. 2C, an outer structure 220 spaced by a clearance gap G from a radially outer tip of a rotor blade 262, is illustrated, in accordance with various embodiments. Outer structure 220 may generally surround rotor blade 262 in a hoop structure or a segmented hoop structure, as described herein in further detail. In various embodiments, outer structure 220 may be similar to control ring 66 as described with respect to FIG. 4A. In various embodiments, outer structure 220 may be similar to engine case 570 as described with respect to FIG. 5A. In various embodiments, the rotor blade 262 is a component of the turbine section 128 as shown in FIG. 1. In various embodiments, the rotor blade 262 is a component of the compressor section 124 as shown in FIG. 1.

A heating element is generally shown at 210. In various embodiments, the heating element 210 may be coupled to an outer surface 222 of outer structure 220 (FIG. 2A). Coupling the heating element 210 to an outer surface 222 may allow for ease of installation of the heating element 210 onto outer structure 220 as well as accessibility to the heating element 210 when installed on the outer structure 220 (e.g., for inspection, repair, and/or replacement).

In various embodiments, the heating element 210 is embedded in the outer structure 220 (FIG. 2B). Embedding the heating element 210 within the outer structure 220 may provide responsive, as well as evenly distributed, heating to the outer structure 220.

In various embodiments, the heating element 210 is spaced apart from the outer structure 220 (FIG. 2C). Spacing apart heating element 210 from the outer structure 220 may allow heating element 210 and outer structure 220 to move relative to each other without imparting mechanical stress therebetween (e.g., thermally induced stresses). Spacing apart heating element 210 from the outer structure 220 may be particularly useful for induction heating applications, as described herein.

The heating element 210 may be wired to an electric power source 205, for instance by way of wires 202 (i.e., leads, lead wires) on opposite sides of the heating element 210. Any appropriate type of arrangements may be used to allow a current supply through the heating element 210 from the electric power source 205. Electric power source 205 may also comprise multiple circuits for instance in parallel to heat up the heating element 210 in segments.

A processor, such as controller 280 may regulate electric power sent to heating element 210. Controller 280 may be implemented as a single controller or as multiple controllers. The controller 280 may be electrically coupled to at least one component of a gas turbine engine. The controller 280 may control the temperature of heating element 210 based upon an operating condition of the gas turbine engine to maintain blade tip clearance gap G. In various embodiments, controller 280 may control the temperature of heating element 210 based upon various operating conditions or states, including altitude, throttle position, rotor speed, and bleed pressure, among others.

In various embodiments, heating element 210 may cause outer structure 220 to increase in temperature via resistive heating using thermal conduction (interface heat transfer). Thus, heating element 210 may increase in temperature in response to an electrical current being passed there through, for instance a resistive heating element (e.g., Joule heating). In this regard, electric power source 205 may provide electric power to heating element 210, wherein in response to the electric power, heating element 210 increases in temperature and conductively transfers thermal energy to outer structure 220.

In various embodiments, with particular focus on FIG. 2C, heating element 210 may cause outer structure 220 to heat up via induction heating. Electric power source 205 may be configured to send alternating current (AC) to heating element 210, wherein in response to receiving the alternating current there through, an electric field, illustrated by lines at 204, is generated by heating element 210. The electric field 204 may penetrate outer structure 220, generating electric currents inside outer structure 220, referred to as eddy currents. The eddy currents, illustrated by lines at 206, flowing through outer structure 220 cause outer structure 220 to heat by Joule heating. Although, heat may also be generated by magnetic hysteresis losses. In this regard, heating element 210 may comprise an electromagnet. Heating element 210 may be made from an electrically conducting material, such as copper for example. Outer structure 220 may be made from an electrically conducting material, including metals such as iron, or an iron alloy, among others. Outer structure 220 may be made from a ferromagnetic material, such as iron for example.

Heating element 210 may cause outer structure 220 to heat up via induction heating when heating element 210 is in contact with outer structure 220 (see FIG. 2A and FIG. 2B) or when heating element 210 is spaced apart from outer structure 220 (see FIG. 2C).

In various embodiments, heating element 210 may comprise a wire, a coil, a hollow tube, a plate, or any other suitable heating element for Joule heating and/or induction heating.

In various embodiments, heating element 210 may be powered after engine shutdown in order to prevent adverse effects caused by rotor bow in compressor section 124. Stated differently, heating element 210 may be powered after engine shutdown in order to prevent gap G from closing. Rotor bow, or thermal bowing, is typically due to asymmetrical cooling after shut-down on a previous flight. Differences in temperature across a shaft section, e.g., low speed spool 130 and/or high speed spool 132 the gas turbine engine supporting the rotor may lead to different thermal deformation of the shaft material, causing the rotor axis to bend. This results in an offset between the center of gravity of the bowed rotor and the bearing axis, causing a slight imbalance and potentially reducing the tight clearance between the rotor blade tips and the compressor wall, which can adversely affect engine performance.

In this regard, a method for controlling a heating element 210 for a gas turbine engine may include detecting, by controller 280, a shutdown of gas turbine engine 120, sending, by controller 280, electrical current to a heating element 210, and heating outer structure 220, via heating element 210, to maintain blade tip clearance gap G.

In accordance with various embodiments, in an active clearance control (ACC) system, air impinges on the turbine case when activated to cool and shrink the case diameter. This in turn reduces the diameter of the segmented blade outer air seal assembly. The seal body in this application is in segments to prevent thermal fighting between the seal and the turbine case to which the seal ultimately mounts to and which is a full hoop. The turbine case that comprises the full hoop structure is what controls the position of the blade outer air seal. Due to the mass of the turbine case and the thermal environment within which the turbine case operates, the turbine case is slow to respond thermally as the engine power level is increased. The turbine rotor diameter, however, will increase rapidly as the rotational speed and temperature of the engine increases. For this reason, extra clearance may be added between the tip of the blade and the blade outer air seal assembly to prevent rubbing contact between these two structures. However, this extra clearance can adversely affect engine performance.

In various embodiments, the present disclosure provides a system and method for mitigating the desire for an ACC system to reduce clearance gap G. Outer structure 220 and rotor blade 262 may be configured such that under "cold" temperatures, e.g., during cruise, clearance gap G is minimal or at a desired dimension without the use of cooling air from an ACC system. In this regard, extra clearance is not added during manufacturing between the tip of the rotor blade 262 and outer structure 220. Rather, blade tip clearance G is configured to be optimal at cruise conditions ("default closed") and heating element 210 is used to maintain clearance gap G in response to events that would otherwise cause blade tip strike, e.g., in response to a throttle acceleration.

In this regard, a method for controlling a heating element 210 for a gas turbine engine may include detecting, by controller 280, an increase in engine throttle of gas turbine engine 120, sending, by controller 280, electrical current to a heating element 210, and heating outer structure 220, via heating element 210, to maintain blade tip clearance gap G.

Figure 2D:
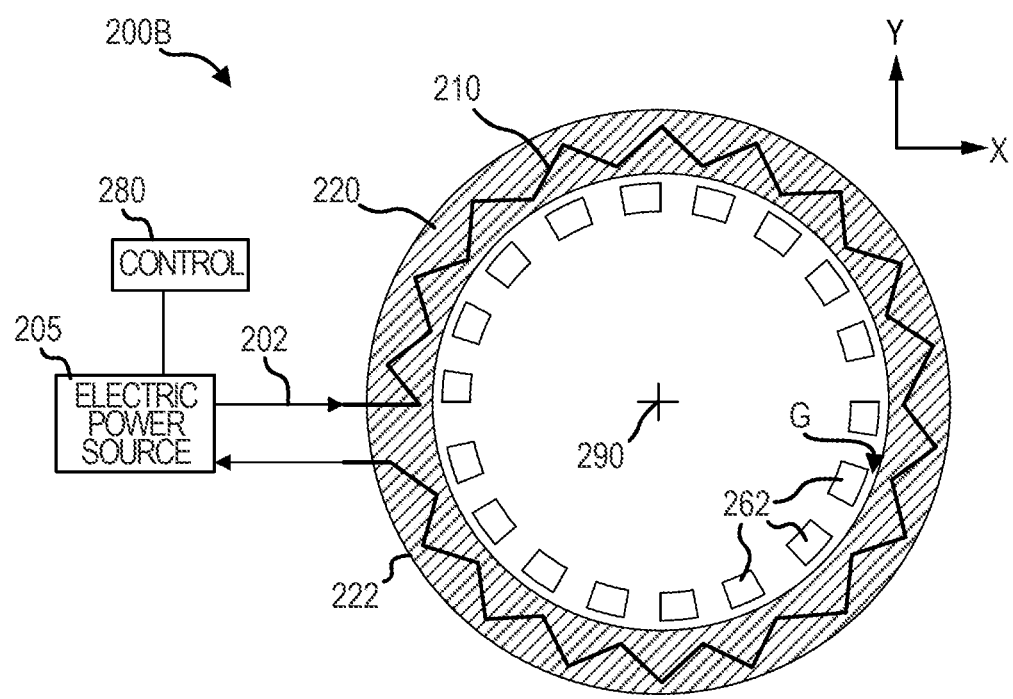
FIG. 2D illustrates a cross section axial view of a heating element embedded in an outer structure disposed radially outward from a blade for maintaining a blade tip clearance gap, in accordance with various embodiments.

With respect to FIG. 2D, elements with like element numbering, as depicted in FIG. 2B, are intended to be the same and will not necessarily be repeated for the sake of clarity.

With reference to FIG. 2D, a cross section axial view of clearance control system 200B is illustrated in accordance with various embodiments. In various embodiments, heating element 210 may be embedded in outer structure 220, similar to FIG. 2B, and in various embodiments, heating element 210 may be coupled to the outer surface of outer structure, similar to FIG. 2A, and in various embodiments, heating element 210 may be spaced apart from outer structure 220, similar to FIG. 2C. Outer structure 220 may define an engine centerline axis 290. Outer structure 220 may surround a plurality of rotor blades 262. Rotor blades 262 may rotate about engine centerline axis 290 with respect to outer structure 220.

Figure 3A:
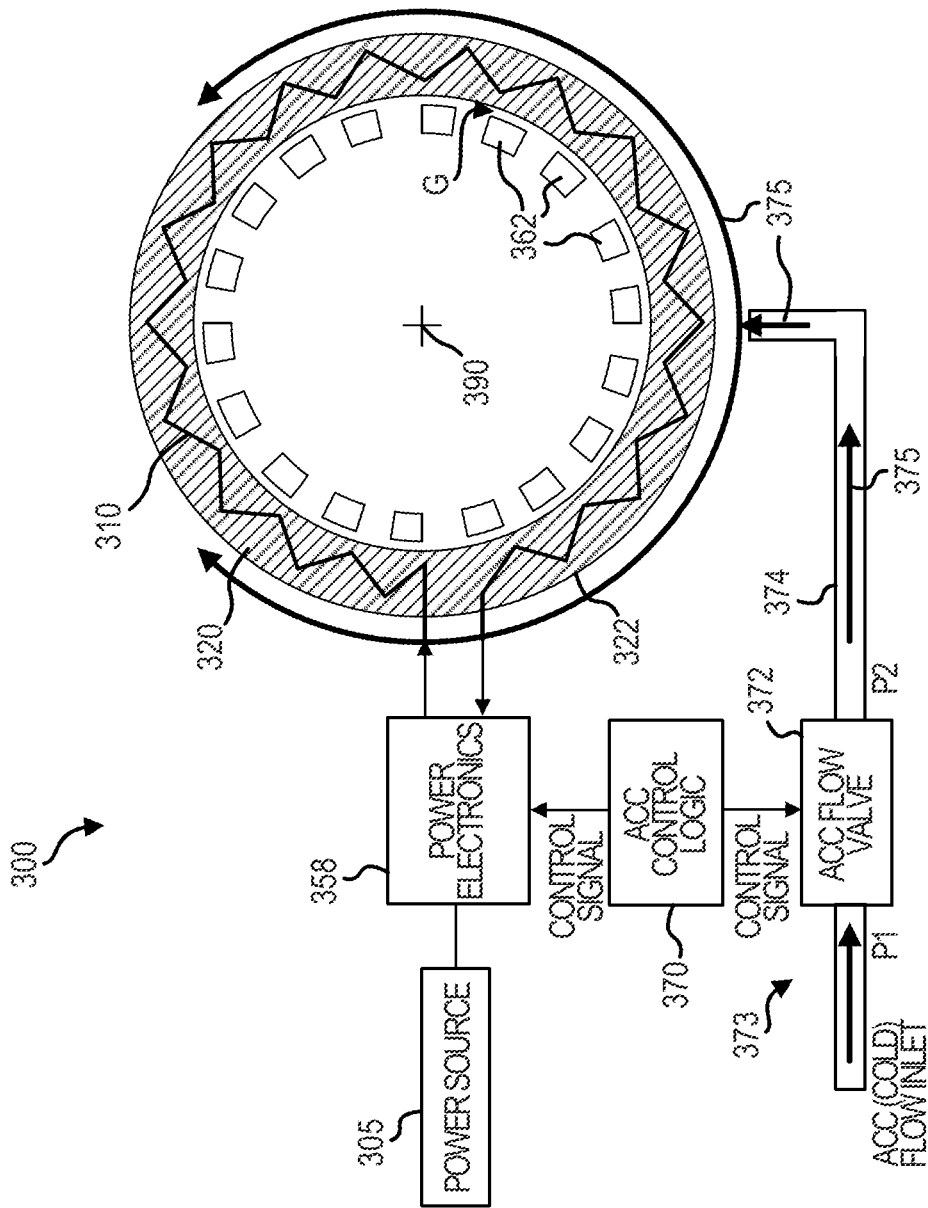
FIG. 3A illustrates a schematic view of a hybrid electric power and control system for a clearance control system for a gas turbine engine, in accordance with various embodiments.

With reference to FIG. 3A, clearance control system 300 may be located aboard an aircraft. Weight and packaging are factors when considering design of a clearance control system for an aircraft. Furthermore, clearance control system 300 may require a substantial amount of power in order to heat an outer structure, such as an engine case for example, to provide the thermal expansion desirable to maintain a blade tip clearance gap G. In this regard, a hybrid electric power source 305 is provided for providing suitable power to clearance control system 300, in accordance with various embodiments. Hybrid electric power source 305 may be capable of providing electric power on the order of kilowatts and/or megawatts of power to clearance control system 300 without depriving the aircraft of electrical power required to operate all other electrical components aboard the aircraft or burdening the engine with additional power offtake at moments when high engine thrust is required.

In various embodiments, hybrid electric power source 305 may comprise one or more batteries, one or more supercapacitors, one or more ultracapacitors, and/or one or more generators, or any other suitable power source, such as a fuel cell for example.

Clearance control system 300 may include power electronic 358. Power electronics 358 may include any suitable power electronics for the control and conditioning of electric power received from hybrid electric power source 305 to heating element 310 and/or valve assembly 372. For example, power electronics 358 may include a bi-directional DC-DC converter for energy storage charging and discharging, an AC-DC rectifier, e.g., a full bridge or a diode, a DC-AC inverter, a silicone control rectifier (SCR), a pulse width modulated (PWM) controlled inverter, a pressure sensor, a temperature sensor, etc. Power electronics 358 may be in electronic communication with hybrid electric power source 305 and an ACC control logic 370.

An injection source 373 may supply a cooling air flow 375 to outer structure 320. The cooling air flow may be supplied from compressor section 124, with momentary reference to FIG. 1. A conduit 374 may route the cooling air flow 375 towards the outer surface 322 of outer structure 320. A valve assembly 372 may be provided for metering the cooling air flow 375.

An ACC control logic 370 may coordinate the operation of the two subsystems (i.e., heating element 310 and cooling air flow 375). Control logic 370 may be implemented on a single processor or on separate processors. The cooling air flow contributes to shrinking the outer structure 320 and therefore reduces blade tip clearance gap G. Because the heat transfer has a long time constant it may be desirable to use the cooling air flow 375 subsystem in near steady-state operation conditions. In transient conditions it may be desirable to conservatively control the cooling air flow 375 to ensure that blade tip clearance gap G is maintained and that rotor blades 363 do not contact outer structure 320. As described, the electrical heating subsystem (i.e., heating element 310) has the opposite effect and leads to a more quick expansion of the outer structure 320. This effect may be desirable when there is potential for the turbomachinery clearances (blade tip clearance gap G) to decrease in a short duration of time, such as for example, when the speed of rotor blades 362 increases abruptly, e.g., increased throttle, and the mechanical growth of rotor blades 362 exceeds the thermal growth of outer structure 320.

Figure 3B:
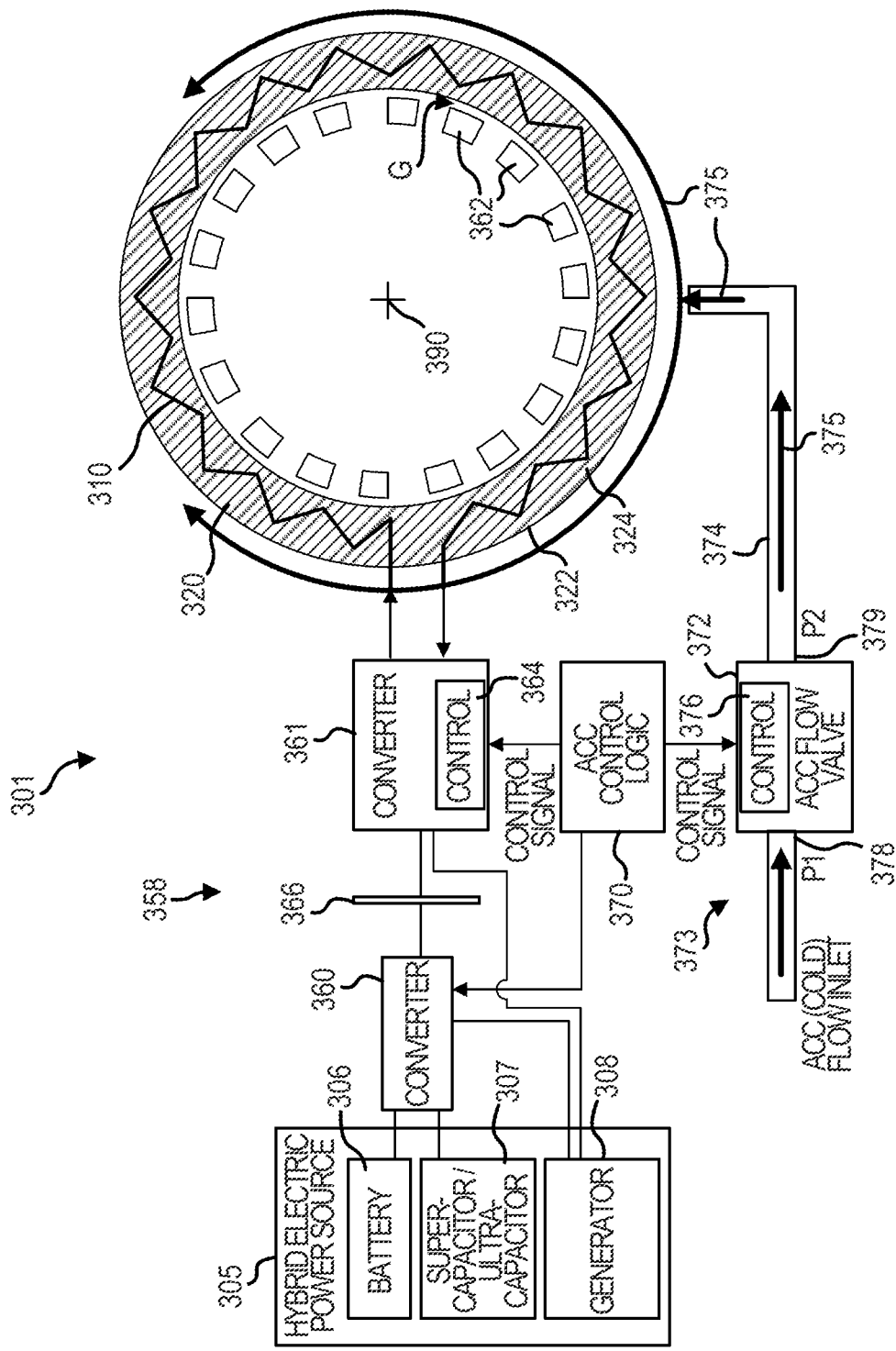
FIG. 3B illustrates a schematic view of a hybrid electric power and control system for a clearance control system for a gas turbine engine, in accordance with various embodiments.

With respect to FIG. 3B, elements with like element numbering, as depicted in FIG. 3A, are intended to be the same and will not necessarily be repeated for the sake of clarity.

With reference to FIG. 3B, a clearance control system 301 is illustrated, in accordance with various embodiments. In various embodiments, hybrid electric power source 305 may comprise one or more batteries 306, one or more capacitors 307, and/or one or more generators 308. In various embodiments, battery 306 may comprise any suitable battery, such as a lithium-ion battery for example. Capacitor 307 may comprise a supercapacitor or an ultracapacitor. In various embodiments, generator 308 may be an auxiliary generator driven by low speed spool 130 or high speed spool 132, with momentary reference to FIG. 1. Any number of batteries 306, capacitors 307 and/or generators 308 may be provided in any suitable arrangement (parallel, series) to provide the electric power suitable for powering clearance control system 300.

In various embodiments, power electronics 358 may include a converter 360. In various embodiments, converter 360 is a bidirectional converter for energy storage charging and discharging. For example, generator 308 may charge battery 306 and/or capacitor 307 via converter 360 in response to battery 306 and/or capacitor 307 being depleted of electrical energy. Furthermore, battery 306 may charge capacitor 307 via converter 360. In various embodiments, converter 360 is a DC/DC converter for supplying DC power to heating element 310. Converter 360 may supply power to heating element 310 via a DC bus 366. Converter 360 may be in electronic communication with ACC control logic 370. Converter 360 may direct energy to and/or from hybrid electric power source 305 in response to commands received from ACC control logic 370.

In various embodiments, power electronics 358 may include a second converter 361. In various embodiments, second converter 361 may be provided to control the electrical power provided to heating element 310. In various embodiments, second converter 361 is a DC/DC converter for converting DC power supplied from DC bus 366 to DC power for heating element 310 (e.g., for resistive heating). In various embodiments, second converter 361 is a DC/AC inverter for converting DC power supplied from DC bus 366 to AC power for heating element 310 (e.g., for induction heating). In various embodiments, second converter 361 is an AC/AC converter and/or a transformer for converting AC power supplied from generator 308 to AC power for heating element 310 (e.g., for induction heating). Second converter 361 may step up, or step down, the voltage and/or current of the AC power, as well as vary the signal frequency, based upon the desired AC power for heating element 310.

Figure 3C:
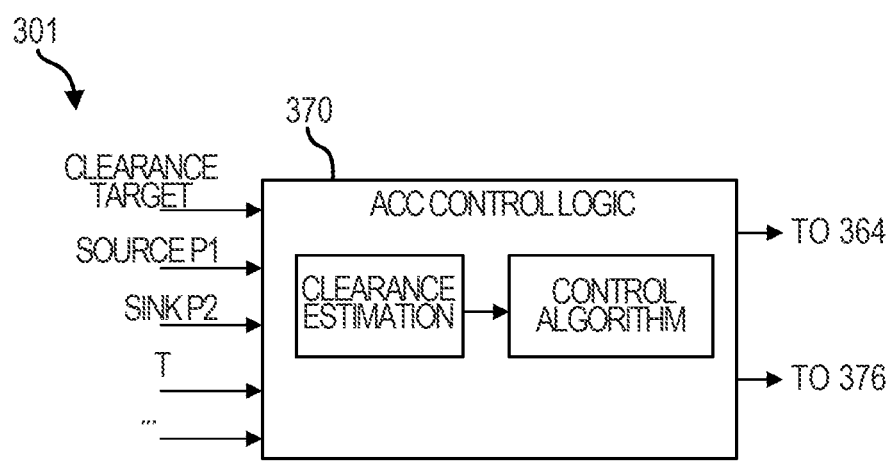
FIG. 3C illustrates a schematic view of an active clearance control logic comprising a clearance estimator and a control algorithm, in accordance with various embodiments.

With reference to FIG. 3C, ACC control logic 370 logic may receive inputs including source pressure P1 (i.e., pressure of cooling air flow 375 upstream of valve assembly 372), sink pressure P2 (i.e., pressure of cooling air flow 375 downstream of valve assembly 372), outer structure temperature T (i.e., temperature of outer structure 320), a target blade tip clearance value (e.g., a desired blade tip clearance gap G), etc. One or more sensors may be used to measure the pressures of the cooling air flow, as well as any other inputs to ACC control logic 370. One or more sensors may be used to measure the temperature of the outer structure. ACC control logic 370 may utilized a constrained model-based control algorithm based upon known and/or measured parameters of the gas turbine engine to estimate the blade tip clearance gap G for supplying control signals to second converter 361 and valve assembly 372.

Figure 4A:
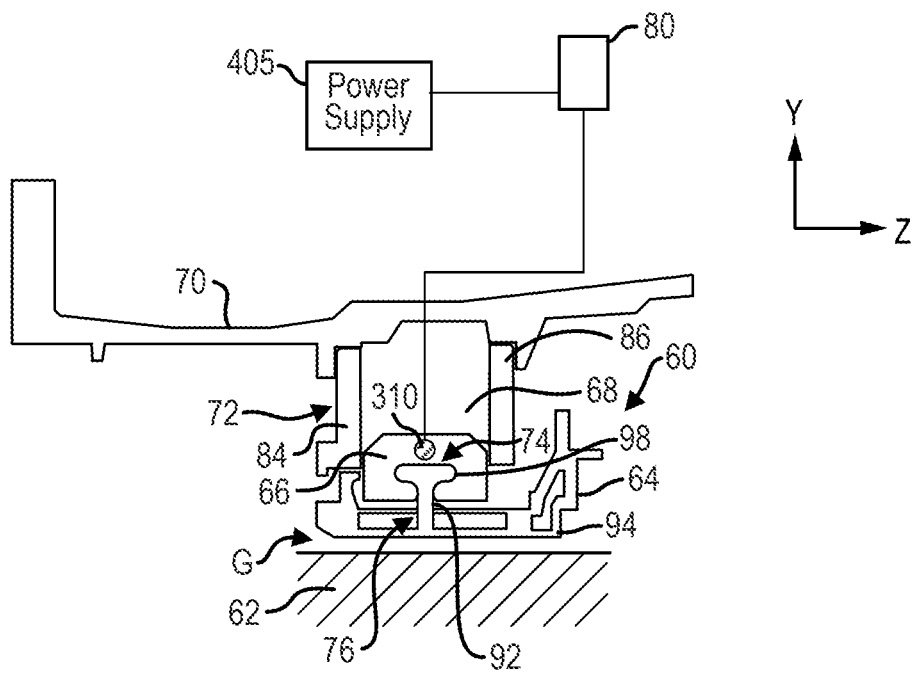
FIG. 4A and FIG. 4B illustrate a section view of a full hoop clearance control ring and a BOAS assembly positioned between a blade and an engine case and an active clearance control system for controlling a position of the BOAS via the clearance control ring, in accordance with various embodiments.

FIG. 4A illustrates an outer air seal assembly 60 spaced by a clearance gap G from a radially outer tip of a rotating blade 62. In various embodiments, the blade 62 is a component of the turbine section 128 as shown in FIG. 1. However, the outer air seal assembly 60 may be used in other engine configurations and/or locations, for example in the compressor sections. The outer air seal assembly 60 includes an outer air seal body 64 that is mounted to a clearance control ring 66. An internal cavity 68 is formed between an engine case 70 and the outer air seal assembly 60. A support structure 72 is associated with the engine case 70 to provide support for the outer air seal assembly 60.

Figure 6:
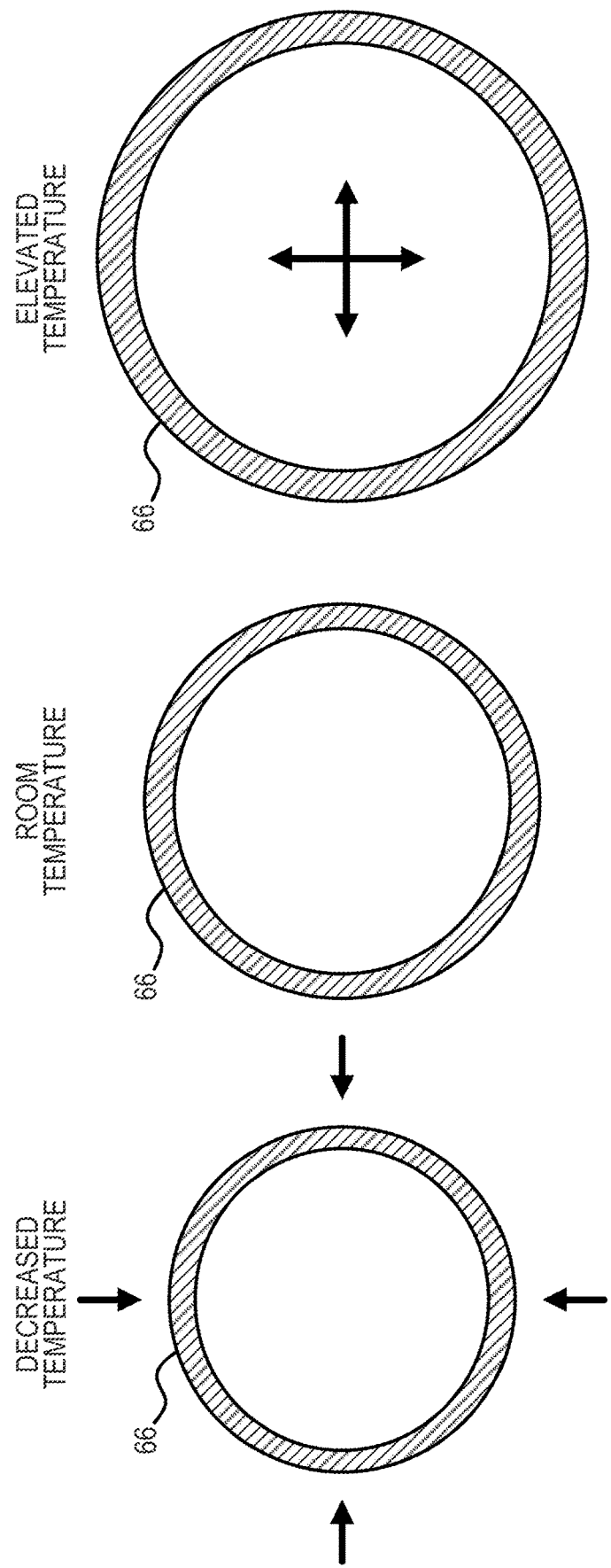
FIG. 6 shows an annular component (e.g., a clearance control ring or an engine case) at room temperature (middle), a decreased temperature (left), and an elevated temperature (right), in accordance with various embodiments.

The subject disclosure provides a configuration where the clearance control ring 66 is positioned adjacent the support structure 72 but is not directly tied to the engine case 70 or support structure 72. In various embodiments, clearance control ring 66 may be formed as an annular ring. In one example configuration, the clearance control ring 66 includes a first mount feature 74 and the seal body 64 includes a second mount feature 76 that cooperates with the first mount feature 74 such that the clearance control ring 66 can move within the internal cavity 68 independently of the support structure 72 and engine case 70 in response to changes in temperature. In various embodiments, the clearance control ring 66 is a full hoop ring (i.e., annular) made from a material with a high thermal expansion coefficient, for example. For example, clearance control ring 66 may comprise a thermal expansion coefficient that is greater than that of engine case 70. For example, with momentary reference to FIG. 6, in accordance with various embodiments, clearance control ring 66 may grow (i.e., increase in diameter) in response to an increase in temperature and, in accordance with various embodiments, clearance control ring 66 may shrink (i.e., decrease in diameter) in response to a decrease in temperature.

With continued reference to FIG. 4A, in various embodiments, the seal body 64 may include a ring mount portion 92. The clearance control ring 66 is radially moveable relative to the first 84 and second 86 radial wall portions in response to temperature changes via the connection interface to the ring mount portion 92. A main seal portion 94 extends from the ring mount portion 92 to face the blade 62.

In various embodiments, clearance control ring 66 may define a slot 98 to receive ring mount portion 92. In the example shown, the clearance control ring 66 includes the slot 98 and the seal body 64 includes the ring mount portion 92; however, the reverse configuration could also be used. In various embodiments, the slot 98 and the ring mount portion 92 comprise a key-shape, with each of the slot 98 and ring mount portion 92 having a first portion extending in a radial direction and a second portion extending in an axial direction. This type of configuration provides a floating connection interface that fully supports and properly locates the seal 64 while still controlling the seal 64 to move radially inwardly and outwardly as needed.

With continued reference to FIG. 4A, clearance control ring 66 may be similar to outer structure 220 of FIG. 2A, FIG. 2B, and/or FIG. 2C, in accordance with various embodiments. A heating element 310 may be configured to cause clearance control ring 66 to vary in temperature to cause clearance control ring 66 to move radially (Y-direction) within internal cavity 68 to maintain or vary clearance gap G. Heating element 310 may be similar to heating element 210 of FIG. 1A, FIG. 1B, and/or FIG. 1C, in accordance with various embodiments. In the illustrated embodiment, heating element 310 is embedded in clearance control ring 66; however, in various embodiments, heating element 310 may be coupled to an outer surface of clearance control ring 66, for instance similar to the illustrated embodiment of FIG. 2C, or may be spaced apart from clearance control ring 66, for instance similar to the illustrated embodiment of FIG. 2C. Control 80 may control the supply of electrical current from one or more power supplies 405 to heating element 310.

The illustrated configuration with the clearance control ring 66 may react faster than prior active control systems due to the reduced thermal mass and due to being exposed to air from the engine gaspath in contrast to prior systems where the heavy turbine case was exposed to the engine core compartment temperatures.

Figure 4B:
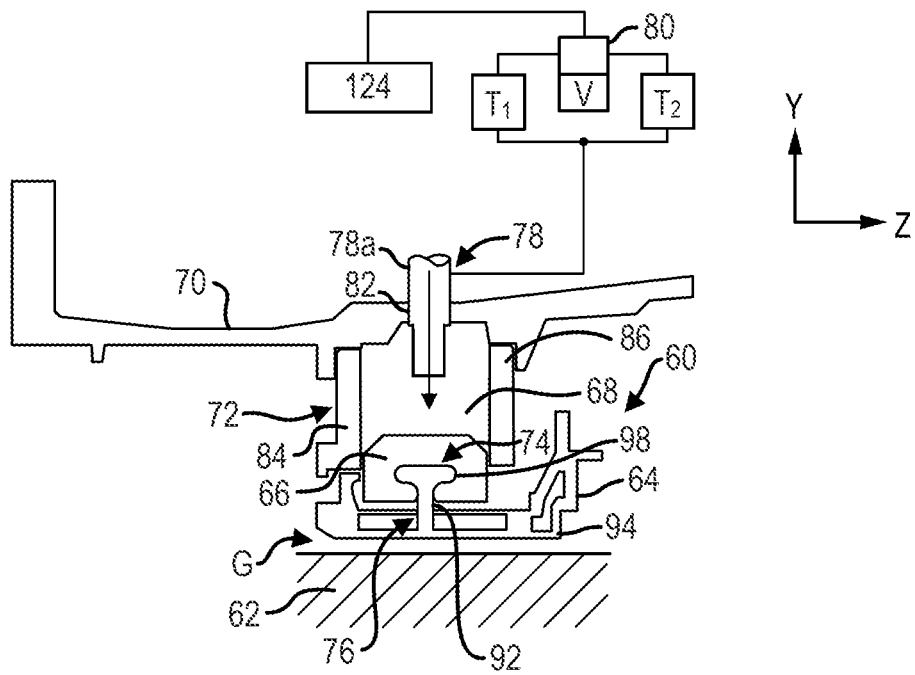

With reference to FIG. 4B, an injection source 78 may inject or deliver cooling fluid flow, for example, air flow, into the internal cavity 68 to control a temperature of the clearance control ring 66 to allow the outer air seal body 64 to move in a desired direction to maintain a desired clearance between the outer air seal body 64 and a tip of the blade 62, i.e., to control the size of the clearance gap G. In one example, the injection source 78 comprises a tube or conduit 78a that receives air flow from the compressor section 124 (FIG. 1) of the gas turbine engine. As shown in FIG. 4B, a control 80 is configured to deliver the compressor air at a first temperature T1 into the internal cavity 68 and against the clearance control ring 66 to allow the outer air seal body 64 to move in a first direction to maintain a desired clearance during a first operating condition, and is configured to deliver compressor air at a second temperature T2 into the internal cavity 68 and against the outer air seal body 64 to allow the outer air seal body 64 to move in a second direction to maintain a desired clearance during a second operating condition. In one example, the first operating condition comprises a takeoff or high load event, and the second operating condition comprises a descending event. In various embodiments, the first operating condition comprises a first throttle setting, and the second operating condition comprises a second throttle setting, the first throttle setting being greater than the second throttle setting.

In these example operating conditions, the second temperature T2 is less than the first temperature T1. In this example, the compressor air at the second temperature T2 can comprise cooled cooling air from the compressor exit while the air at the first temperature can comprise uncooled compressor exit air. The control 80 comprises a microprocessor and/or control unit that is programmed to deliver air flow at the first T1 or second T2 temperature as needed dependent upon the engine operating condition. The control 80 may further include valves V, flow conduits, and/or heat exchangers as needed to deliver the compressor air at the desired temperature. The control 80 delivers higher temperature air T1 into the cavity 68 when the clearance control ring 66 is to increase in diameter and delivers lower temperature air T2 into the cavity 68 when the clearance control ring 66 is to decrease in diameter. It should be understood that while two different temperatures are discussed as examples, the system is variable and the system can deliver fluid at any desired temperature.

The engine case 70 may include an opening 82 to receive the conduit 78a which directs compressor air into the cavity 68. The support structure 72 includes a first radial wall portion 84 extending radially inward from the engine case 70 and a second radial wall portion 86 axially spaced from the first radial portion 84 to define the internal cavity 68. The opening 82 may be positioned axially between the first 84 and second 86 radial portions. The engine case 70 includes trenches or grooves 88 adjacent to each of the first 84 and second 86 radial wall portions.

In various embodiments, heating element 310 may work in concert with injection source 78 to maintain clearance gap G, enabling two-directional clearance control and tighter running clearances as a result of smaller margins for maneuvers where outer seal assembly 60 would otherwise be too slow to expand. Heat caused by heating element 310 may cause outer seal body 64 to move in the radially outward direction (positive Y-direction, also referred to herein as a first direction). The cooling air flow supplied by injection source 78 may cause outer seal body 64 to move in the radially inward direction (negative Y-direction, also referred to herein as a second direction).

Figure 5A:
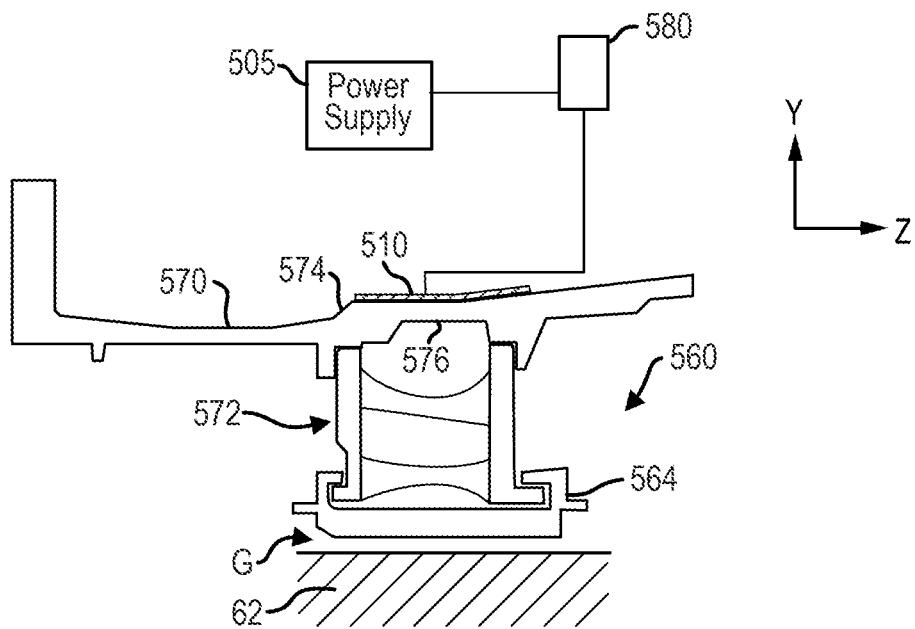
FIG. 5A and FIG. 5B illustrate a section view of a BOAS assembly positioned between a blade and an engine case and an active clearance control system for controlling a position of the BOAS via the engine case, in accordance with various embodiments.
Figure 5B:
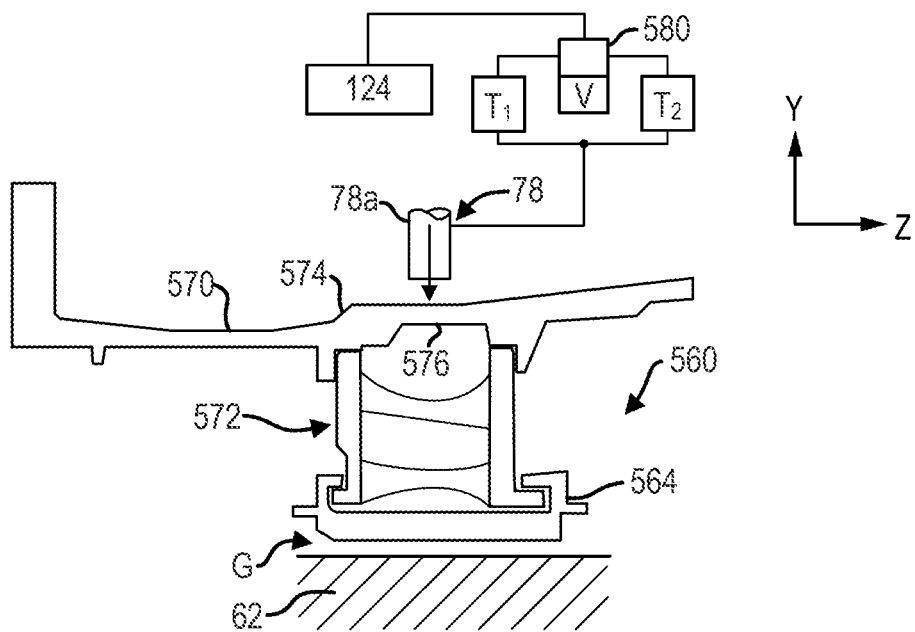

With respect to FIG. 5A and FIG. 5B, elements with like element numbering, as depicted in FIG. 4A and FIG. 4B, are intended to be the same and will not necessarily be repeated for the sake of clarity.

FIG. 5A illustrates an outer air seal assembly 560 spaced by a clearance gap G from a radially outer tip of a rotating blade 62. In various embodiments, the blade 62 is a component of the turbine section 128 as shown in FIG. 1. However, the outer air seal assembly 560 may be used in other engine configurations and/or locations, for example in the compressor sections. The outer air seal assembly 560 includes an outer air seal body 564 that is mounted to a support structure 572. The support structure 572 is associated with the engine case 570 to provide support for the outer air seal assembly 560. The outer air seal body 564 may be mounted to engine case 570 via support structure 572 and may move with engine case 570 in response to changes in temperature.

Engine case 570 may be similar to outer structure 220 of FIG. 2A, FIG. 2B, and/or FIG. 2C, in accordance with various embodiments. A heating element 510 may be configured to cause engine case 570 to vary in temperature to cause engine case 570 to move radially (Y-direction) to maintain or vary clearance gap G. Heating element 510 may be similar to heating element 210 of FIG. 1A, FIG. 1B, and/or FIG. 1C, in accordance with various embodiments. In the illustrated embodiment, heating element 510 is coupled to a distal surface 574 of engine case 570; however, in various embodiments, heating element 510 may be coupled to the proximal surface 576 of engine case 570, may be embedded in engine case 570, for instance similar to the illustrated embodiment of FIG. 2B, or may be spaced apart from engine case 570, for instance similar to the illustrated embodiment of FIG. 2C. Control 580 may control the supply of electrical current from one or more power supplies 505 to heating element 80.

With reference to FIG. 5B, an injection source 578 may inject or deliver cooling fluid flow, for example, air flow, onto distal surface 574 of engine case 570 to cause the outer air seal body 564 to move in a desired direction to maintain a desired clearance between the outer air seal body 564 and a tip of the blade 62, i.e. to control the size of the clearance gap G. Injection source 578 may operate similarly as described with respect to injection source 78 of FIG. 3B. Stated differently, injection source 578 may be similar to injection source 78 of FIG. 3B, except that injection source 578 directs cooling fluid flow to engine case 570, instead of a clearance control ring.

In various embodiments, heating element 510 may work in concert with injection source 578 to maintain clearance gap G, enabling active bi-directional clearance control and tighter running clearances as a result of smaller margins for maneuvers where outer air seal assembly 560 would otherwise be too slow to expand. In this regard, with reference now to FIG. 3A, ACC control logic 370 may control both electrical current supplied to heating element 310 and the position of valve assembly 372 for controlling cooling air flow 375 for both expansion and contraction of outer structure 320. In this regard, the term "bi-directional control" as used herein may refer to the control of the expansion and contraction of outer structure 320 (e.g., the engine case and/or the clearance control ring).

Figure 7:
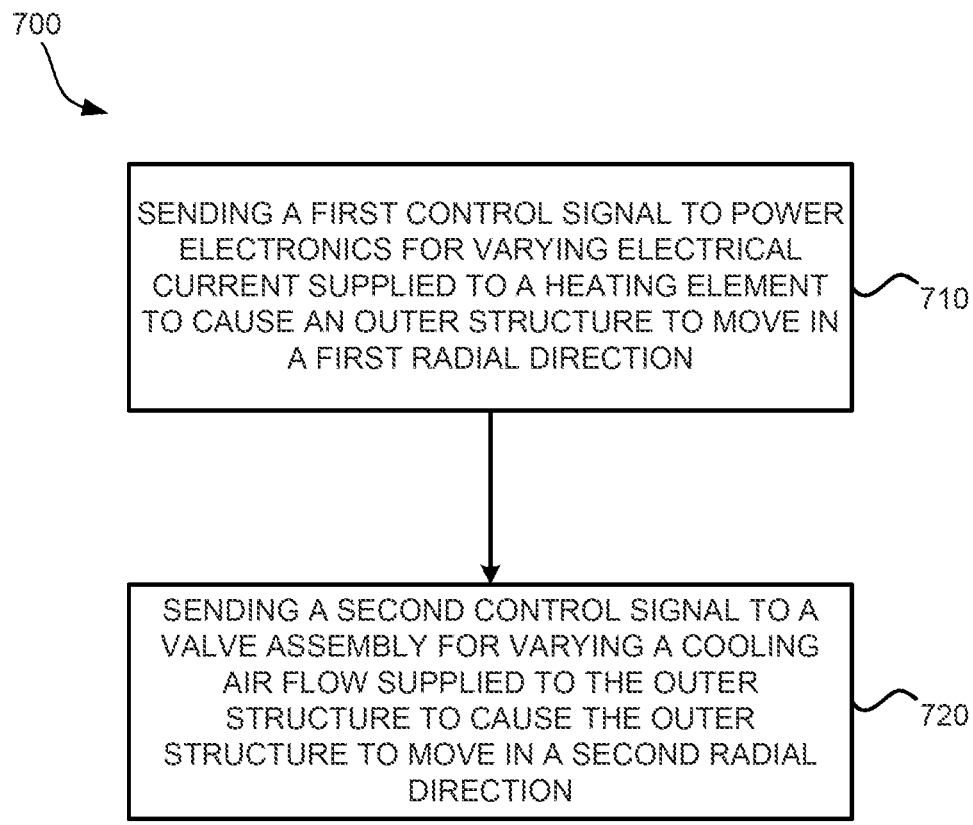
FIG. 7 shows a flow chart illustrating a method for active bi-directional control of an outer structure, in accordance with various embodiments.

With reference to FIG. 7, a method 700 for active bi-directional control of an outer structure for blade tip clearance management is illustrated, in accordance with various embodiments. Method 700 includes sending a first control signal to power electronics for varying electrical current supplied to a heating element to cause an outer structure to move in a first radial direction (step 710). Method 700 includes sending a second control signal to a valve assembly for varying a cooling air flow supplied to the outer structure to cause the outer structure to move in a second radial direction (step 720).

With combined reference to FIG. 3B and FIG. 7, step 710 may include sending, by ACC control logic 370, the first control signal to second converter 361 to vary the blade tip clearance G. The first control signal may be any suitable control signal for controlling the power output of second converter 361 (e.g., a voltage signal and/or a current signal).

Step 720 may include sending, by ACC control logic 370, a second control signal to valve assembly 372 to vary the blade tip clearance G. The second control signal may be any suitable control signal for controlling the position of valve assembly 372 (e.g., a voltage signal and/or a current signal) to vary the cooling air flow 375.

Figure 8:
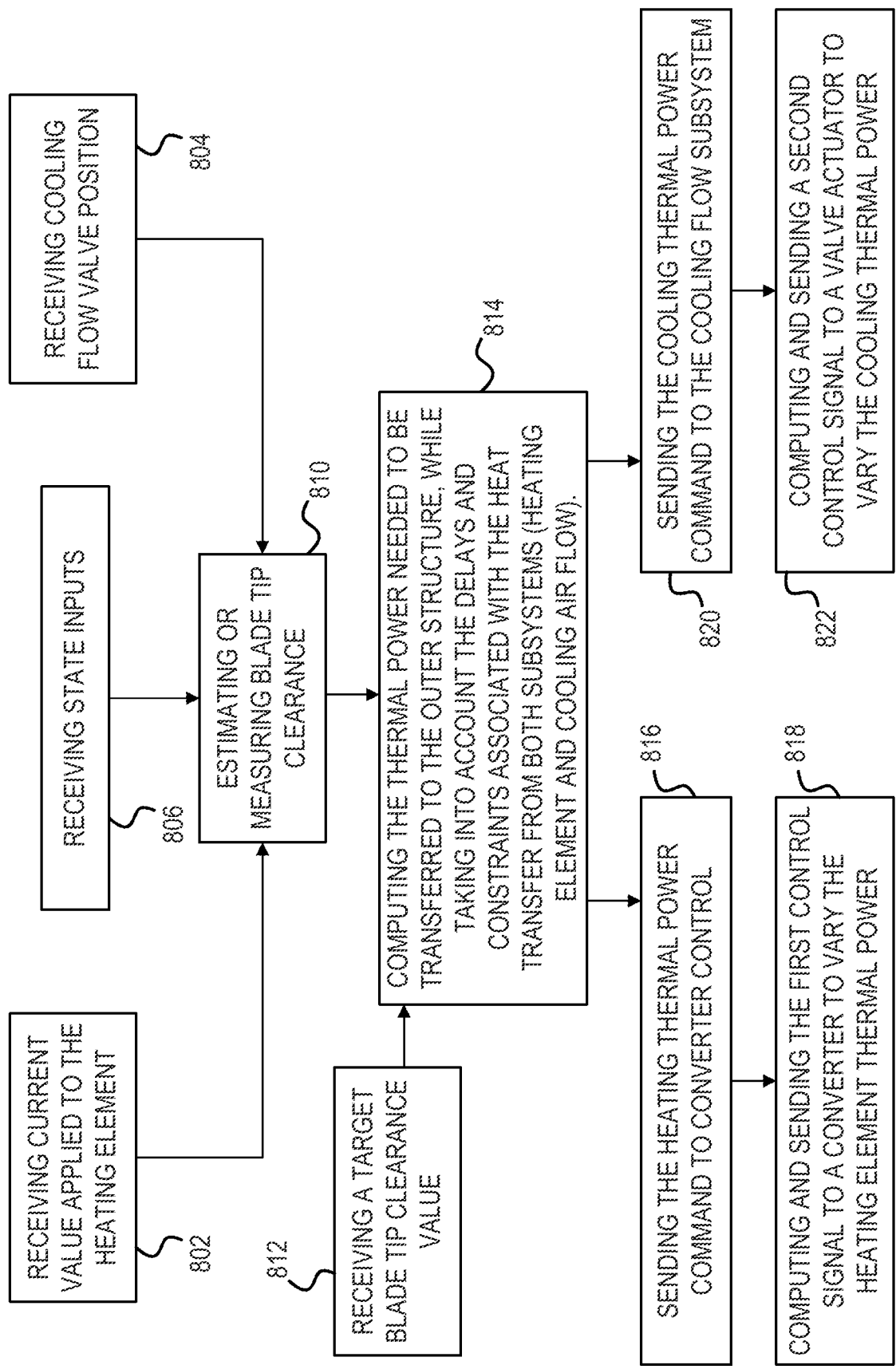
FIG. 8 shows a flow chart illustrating a method for active bi-directional control of an outer structure, in accordance with various embodiments.

With additional reference to FIG. 8, in various embodiments, step 710 and step 720 may include receiving, by ACC control logic 370, an electrical current value currently being applied to heating element 310 (see step 802). Step 710 and step 720 may include receiving, by ACC control logic 370, a valve position of valve assembly 372 (e.g., open, closed, etc.) (step 804).

Step 710 and step 720 may include receiving, by ACC control logic 370, one or more state inputs (step 804). The state inputs may include various engine operating states or conditions. The state inputs may include a temperature value of outer structure 320, at least one pressure value (e.g., pressure value P1 and/or pressure value P2), engine throttle position, rotor speed (e.g., rotational velocity of rotor blades 362 (see FIG. 3A)), and/or altitude, among others. In various embodiments, a temperature sensor 324 may be in thermal communication with heating element 310 and/or outer structure 320 whereby ACC control logic 370 may detect the temperature of outer structure 320. In various embodiments, a first pressure sensor 378 may me located upstream from valve assembly 372 and a second pressure sensor 379 may be located downstream from valve assembly 372 whereby ACC control logic 370 may detect pressure P1 and pressure P2, respectively. In various embodiments, the pressure values may be directly measured or may be synthesized.

Step 710 and step 720 may include measuring, by ACC control logic 370, the actual blade tip clearance gap (e.g., blade tip clearance gap G) (step 810). blade tip clearance gap G may be measured using any suitable method. For example, blade tip clearance gap G may be measured using capacitive measurements between rotor blades 362 and outer structure 320 with momentary reference to FIG. 3A. In various embodiments, blade tip clearance gap G may be measured using X-ray techniques, among others.

Step 710 and step 720 may include estimating, by ACC control logic 370, the actual blade tip clearance gap (e.g., blade tip clearance gap G) (step 810). The estimated blade tip clearance may be determined using any suitable method. For example, the estimated blade tip clearance may be determined based upon the electrical current currently being applied to heating element 310, the valve position of valve assembly 372, and the state inputs.

Step 710 and step 720 may include receiving, by ACC control logic 370, a target blade tip clearance value (step 812). The target blade tip clearance value may be a predetermined blade tip clearance value. The target blade tip clearance value may be a desired blade tip clearance. In various embodiments, the first control signal is based upon the estimated blade tip clearance gap G. For example, the first control signal may be configured to adjust the power output of second converter 361 to cause outer structure 320 to increase in temperature or decrease in temperature based upon a difference between the estimated blade tip clearance gap and the target blade tip clearance gap. Stated differently, ACC control logic 370 may be configured to adjust the electrical current supplied to heating element 310 to minimize the difference between the estimated blade tip clearance gap and the target blade tip clearance gap.

In various embodiments, the first control signal is based upon the measured blade tip clearance gap G. For example, the first control signal may be configured to adjust the power output of second converter 361 to cause outer structure 320 to increase in temperature or decrease in temperature based upon a difference between the measured blade tip clearance gap and the target blade tip clearance gap. Stated differently, ACC control logic 370 may be configured to adjust the electrical current supplied to heating element 310 to minimize the difference between the measured blade tip clearance gap and the target blade tip clearance gap.

In various embodiments, the second control signal is based upon the estimated blade tip clearance gap. For example, the second control signal may be configured to adjust a position of valve assembly 372 (e.g., between an open position and a closed position) to cause outer structure 320 to increase in temperature or decrease in temperature based upon a difference between the estimated blade tip clearance gap and the target blade tip clearance gap. Stated differently, ACC control logic 370 may be configured to adjust the cooling air flow 375 supplied outer structure 320 to minimize the difference between the estimated blade tip clearance gap and the target blade tip clearance gap.

In various embodiments, the second control signal is based upon the measured blade tip clearance gap. For example, the second control signal may be configured to adjust a position of valve assembly 372 (e.g., between an open position and a closed position) to cause outer structure 320 to increase in temperature or decrease in temperature based upon a difference between the measured blade tip clearance gap and the target blade tip clearance gap. Stated differently, ACC control logic 370 may be configured to adjust the cooling air flow 375 supplied outer structure 320 to minimize the difference between the measured blade tip clearance gap and the target blade tip clearance gap.

In various embodiments, step 710 and/or step 720 may include computing the thermal power needed to be transferred to the outer structure, while taking into account the delays and constraints associated with heat transfer from both subsystems (i.e., heating element 310 and cooling air flow 375 (step 814). Computing the thermal power may be implemented using various control methods. For example, the thermal power may be computed using internal models of the turbomachinery clearance that represent the transient response of the clearance to both inputs (i.e., electrical current/voltage/PWM duty-cycle, and cold flow). The models may use both estimated and measured parameters. The two inputs may be coordinated in order to track as closely as possible the target clearance value (rapid expansion during rapid accelerations realized via heating element, and slower contraction control via the cooling air flow). Control methods may include single-input single-output (SISO) methods. Various rules may be combined with the SISO method(s). In various embodiments, a single proportional-integral-derivative control logic may use the error between the target clearance and the current clearance (estimated or measured) for generating the control signal communicated to the power electronics module (e.g., for case expansion) or to the cold flow control valve (e.g., for case contraction). In various embodiments, a rule combined with two SISO loops may be used—one for the power electronics module and one for the cold flow control. The rule may determine which loop is active, and the respective SISO logic determines the level of current/voltage/duty-cycle or the cold flow valve control signal. Control methods may include multi-input multi-output (MIMO) control methods. MIMO methods may use an integrated model for outer structure radial displacement (contraction/expansion) capturing the dynamics from valve position to outer structure contraction and power electronics signal to outer structure expansion into a single model. MIMO methods may include nonlinear control methods. For example, switching-based control logic that select the active subsystem and its corresponding control signal in the same design (with no additional rules). Constrained model-based control (e.g., currently implemented in the full authority digital engine control (FADEC) for controlling other effectors) that in addition to dynamical system model also include constraints associated with valve current, heating element current and/or voltage, rates of expansion/contraction, etc. MIMO methods may include predictive control that, at any time step, uses a prediction of the outer structure radial displacement levels over a few future time steps. These methods may improve the clearance control accuracy by compensating for the effects of the delays associated with the heat transfers.

In various embodiments, ACC control logic 370 may send a heating thermal power command to converter control 364 (step 816). Converter control 364 may compute and send the first control signal to converter 361 for varying the electrical current supplied to heating element 310 to vary the heating thermal power applied to outer structure 320 (step 818). In various embodiments, converter control 363 may be implemented in ACC control logic 370; for example, converter control 363 and ACC control logic 370 may be implemented in a single processor. In various embodiments, converter control 363 may be implemented separately from ACC control logic 370; for example, converter control 363 and ACC control logic 370 may be implemented in separate processors.

In various embodiments, ACC control logic 370 may send a cooling thermal power command to valve control 376 (step 820). Valve control 376 may compute and send the second control signal to valve assembly 372 (e.g., to a solenoid) for varying the cooling air flow 375 supplied to outer structure 320 to vary the cooling thermal power applied to outer structure 320 (step 822). In various embodiments, valve control 376 may be implemented in ACC control logic 370; for example, valve control 376 and ACC control logic 370 may be implemented in a single processor. In various embodiments, valve control 376 may be implemented separately from ACC control logic 370; for example, converter control 363 and ACC control logic 370 may be implemented in separate processors.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for active bi-directional control of an outer structure of a gas turbine engine, comprising:
   sending, by a controller, a first control signal to a power electronics for varying an electric current supplied to a heating element to cause the outer structure to move in a first radial direction;
   sending, by the controller, a second control signal to a valve assembly for varying a cooling air flow supplied to the outer structure to cause the outer structure to move in a second radial direction, the second radial direction is opposite the first radial direction;
   receiving, by the controller, an electrical current value currently being supplied to the heating element;
   receiving, by the controller, a current valve position; and
   determining, by the controller, a current blade tip clearance value based upon the electrical current value and the current valve position.

2. The method of claim 1, further comprising varying a blade tip clearance in response to the outer structure moving.

3. The method of claim 1, further comprising:
   receiving, by the controller, a target blade tip clearance value;
   wherein the first control signal and the second control signal are based upon the current blade tip clearance value and the target clearance value.

4. The method of claim 1, wherein sending, by the controller, the first control signal to the power electronics comprises sending, by the controller, the first control signal to a converter.

5. The method of claim 4, wherein the converter comprises at least one of a DC/DC converter, a DC/AC converter, or an AC/AC converter.

6. The method of claim 4, wherein the converter is configured to supply the electric current to the heating element.

7. A bi-directional clearance control system, comprising:
   a power electronics;
   a heating element;
   a valve assembly; and
   a controller in electronic communication with the power electronics and the valve assembly, wherein the controller is configured to:
   send a first control signal to the power electronics for varying an electric current supplied to the heating element to cause an outer structure to move in a first radial direction; and
   send a second control signal to the valve assembly for varying a cooling air flow supplied to the outer structure to cause the outer structure to move in a second radial direction, the first radial direction is opposite the second radial direction;
   receive an electrical current value currently being supplied to the heating element;
   receive a current valve position;
   determine a current blade tip clearance value based upon the electrical current value and the current valve position.

8. The bi-directional clearance control system of claim 7, wherein a blade tip clearance is configured to be varied in response to the outer structure moving.

9. The bi-directional clearance control system of claim 7, wherein the controller is further configured to:
   receive a target blade tip clearance value;
   wherein the first control signal and the second control signal are based upon the current blade tip clearance value and the target clearance value.

10. The bi-directional clearance control system of claim 7, wherein sending, by the controller, the first control signal to the power electronics comprises sending, by the controller, the first control signal to a converter.

11. The bi-directional clearance control system of claim 10, wherein the converter comprises at least one of a DC/DC converter, a DC/AC converter, or an AC/AC converter.

12. The bi-directional clearance control system of claim 10, wherein the converter is configured to supply the electric current to the heating element.

13. A method for active bi-directional control of an outer structure of a gas turbine engine, comprising:

sending, by a controller, a first control signal to a converter of a power electronics for varying an electric current supplied to a heating element to cause the outer structure to move in a first radial direction; and sending, by the controller, a second control signal to a valve assembly for varying a cooling air flow supplied to the outer structure to cause the outer structure to move in a second radial direction;

wherein the first radial direction is opposite the second radial direction.

14. The method of claim 13, further comprising varying a blade tip clearance in response to the outer structure moving.

15. The method of claim 13, wherein the converter comprises at least one of a DC/DC converter, a DC/AC converter, or an AC/AC converter.

16. The method of claim 13, wherein the converter is configured to supply the electric current to the heating element.

17. A bi-directional clearance control system, comprising:
a power electronics comprising a converter;
a heating element;
a valve assembly; and
a controller in electronic communication with the power electronics and the valve assembly, wherein the controller is configured to:

send a first control signal to the converter of the power electronics for varying an electric current supplied to the heating element to cause an outer structure to move in a first radial direction; and send a second control signal to the valve assembly for varying a cooling air flow supplied to the outer structure to cause the outer structure to move in a second radial direction, the first radial direction is opposite the second radial direction.

18. The bi-directional clearance control system of claim 17, wherein the controller is further configured to vary a blade tip clearance in response to the outer structure moving.

19. The bi-directional clearance control system of claim 17, wherein the converter comprises at least one of a DC/DC converter, a DC/AC converter, or an AC/AC converter.

* * * * *